Oct. 20, 1970  J. GODOY SOLER-ESPIAUBA  3,534,536
MACHINE FOR PICKING OLIVES AND OTHER FRUITS
Filed Sept. 11, 1967

INVENTOR
JOSE GODOY SOLER-ESPIAUBA

United States Patent Office 3,534,536
Patented Oct. 20, 1970

3,534,536
MACHINE FOR PICKING OLIVES
AND OTHER FRUITS
Jose Godoy Soler-Espiauba, Paseo Alfonso XIII 47,
Cartagena, Murcia, Spain
Filed Sept. 11, 1967, Ser. No. 666,774
Claims priority, application Spain, Nov. 12, 1966,
333,298
Int. Cl. A01g 19/08
U.S. Cl. 56—332                                          4 Claims

ABSTRACT OF THE DISCLOSURE

The present invention is concerned with a machine for picking olives and other fruits whose dimensions and characteristics are similar to those of the olive. The machine in question operates by means of mechanisms which are well known, and through shafts which are flexible or joined to combs endowed with tines of elliptical section, to which combs the machine imparts a to-and-fro or circular movement. The device is fixed at the end of a pole which is handled by the person concerned with the picking.

DESCRIPTION OF THE PRIOR ART

At the present time there exist various machines intended for the picking of olives and other fruits, and which may be classified into two fundamental types: vibratory machines and those equipped with rods.

The vibratory machines bring about the detachment of the fruit by subjecting the tree to an intense vibration which, although it causes the fruit to fall in large quantities, damages the tree.

The machines employing rods fulfill the same function as rods operated by hand, but have the disadvantage that their effect is difficult to control, and for this reason they cause damage to both the fruit and the tree.

SUMMARY OF THE INVENTION

The subject of the present invention is a machine which, by means of a mechanical process, brings about detaching of the fruit without causing damage to either the tree or the fruit.

The said mechanical process consists essentially of a number of combs endowed with an alternating to-and-fro movement or fitted on a shaft subjected to a rotary movement, which said combs pass among the branches and gently detach the fruit. The said combs are fitted on suitable rods or supports easily handled by a single individual. The surfaces of the tines are smooth and without sharp edges with the object of not damaging the fruit to be picked, the separation between the tines and the angle at which they are set being suitable for the fruit being picked.

Thus, the invention essentially consists of a machine having a power group from which flexible power transmission elements are arranged to operate fruit-picking devices. The fruit-picking devices consist of combs with tines having either alternating to-and-fro movement or rotary movement.

One of the improvements of the invention comprises the use of an electrical energy generating group in combination with the machine of the invention, and the electrical energy generating group functions to supply energy to electric motors situated in individual fruit-picking devices. The electrical generating group may be in the form of an alternator operated by means of an elastic coupling and connected to an internal combustion motor by means of a speed reducer.

The invention is complemented by the fact that the fruit-picking devices of rotary type may have one, two or three or more rows of tines, the rotary movement being in one direction or with alternating changes of direction, and with either complete or partial rotation. The tines, in accordance with an advantageous form of construction, have an elliptical cross section.

The operation of the combs is effected by any of the known mechanisms, it being possible to employ flexible or articulated shafts, or pneumatic means to bring about the movement in question.

With the aim of facilitating a better interpretation of the invention, in the annexed drawings which complement the present exposition there is represented a practical form for its industrial production, which is included without any constrictive character and is merely informative.

In the said drawings:

FIG. 8 shows a lateral view of a machine endowed with an electric system for operating the picking devices.

FIG. 9 shows a lateral view of a rotatory comb with a single row of tines.

FIG. 10 shows a lateral view of a comb wtih four rows of tines.

FIG. 11 shows a cross-section of various kinds of a comb.

Figure 1:
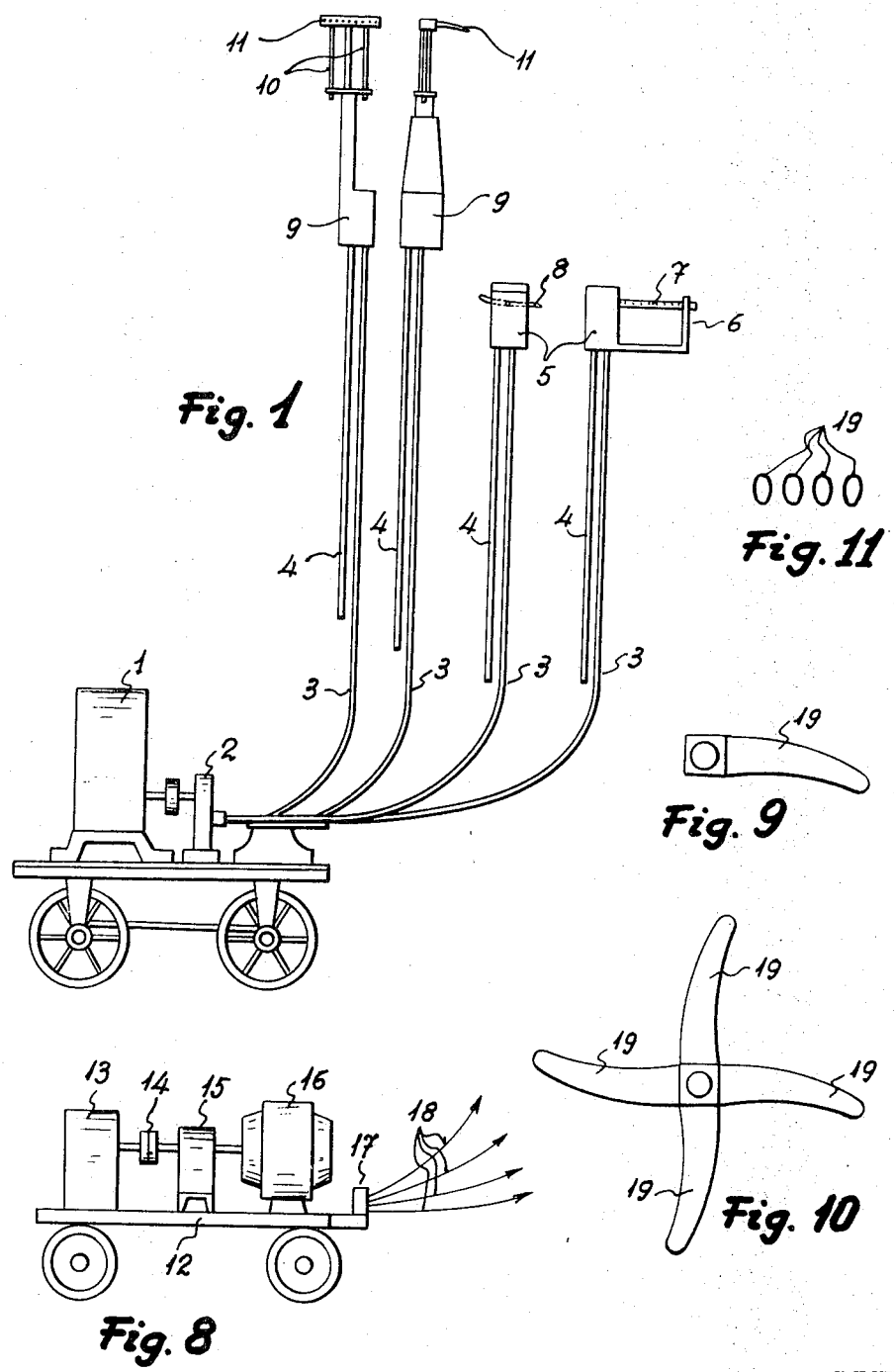
FIG. 1 shows a lateral view of a machine constructed in accordance with the invention, which machine operates simultaneously four picking devices, with combs and to-and-fro devices and with rotatory combs, it being possible to utilize only to-and-fro combs or rotatory combs in accordance with the needs of any given moment.

As is shown in FIG. 1 the machine is constituted by a motor 1, fitted on a chassis equipped with wheels to enable it to be moved; the said motor is coupled to a speed reducer 2, equipped with the various driving shafts to which the flexible or articulated shafts 3 are coupled. The said shafts terminate in the movement transformers 5 or 9 in accordance with the type of movement of the comb.

The movement transformer mechanism 9 in the case represented is of the type with gears, crank and connecting rod, which operates a pole on the end of which the comb 11 is fitted, which comb moves with an alternating movement, balanced by the guides 10.

The mechanism 5, is of the conical gear type, and operates the shaft 7 when it is of interest to utilize the rotatory cones with radial times 8.

It is evident that the mechanisms which may be substituted by other equivalent means of a mechanical or pneumatic nature.

For example, the motor 1 may move a compressor and send the compressed air through the hoses to piston or turbine devices which operate the combs endowed with either alternating or rotatory movement.

In any event, the operating device is fixed to the end of a pole 4 which makes it possible to reach the branches irrespective of their height.

Figure 2:
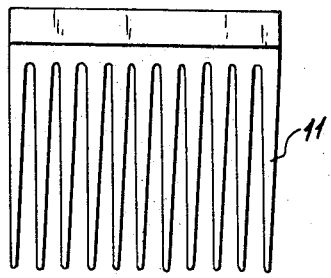
FIGS. 2, 3 and 4 represent respectively in plan, front, and side elevation views a comb endowed with a to-and-fro movement.
Figure 3:
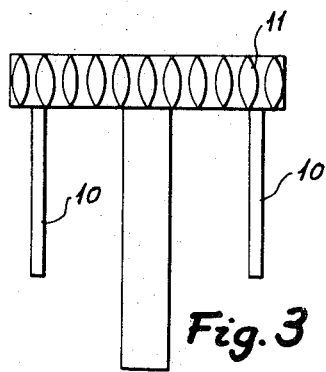
Figure 4:
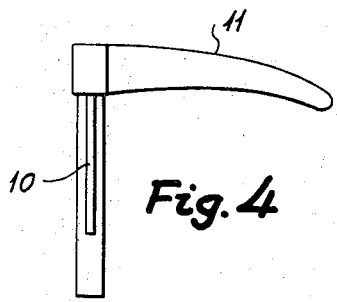

As is shown in FIGS. 2, 3 and 4, the to-and-fro mechanism has as its fundamental element a comb 11, constituted by the tines with rounded and smooth surfaces and without sharp edges, suitably separated and slightly curved, which are introduced among the branches of the tree so that by means of the alternate to-and-fro movement in an upward and downward direction the fruit may be separated from the tree.

Figure 5:
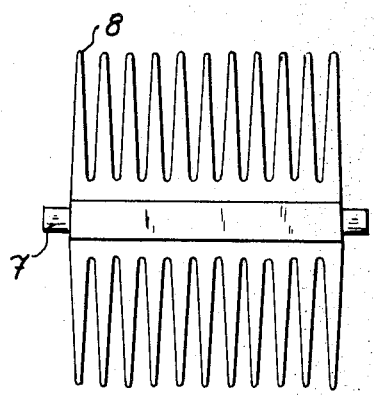
FIGS. 5, 6 and 7 represent respectively plan, front and side views of a comb endowed with rotatory movement.
Figure 6:
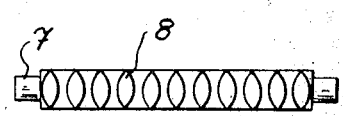
Figure 7:
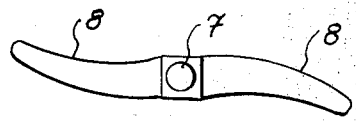

In FIGS. 5, 6 and 7 the picking device is constituted by a shaft 7 on which there are fitted the tines 8, slightly curved in the direction of their movement, which tines are subjected, in the manner indicated above, to a rotatory movement so that when they are introduced among the branches they will cause the fruit to be picked.

As is shown in FIG. 8, the power group of the machine consists of a combustion engine 13, connected by means of the elastic coupling 14, and the speed reducer 15, to the alternator 16; the complex is situated on the chassis 12, which is equipped with wheels in order that it may be moved from place to place.

On the said chassis there is fitted the terminal housing 17, to which there are connected the flexible conductors 18 which feed each of the motors which operate the corresponding picking device.

In FIGS. 9 and 10 there are represented in the form of a lateral view picking devices of a rotary type constituted by one or by four rows of tines respectively.

The said tines 19, as is shown in FIG. 11, are ellipsoidal in section.

The rotary movement of the said devices may be either continuous in the same direction, or the movement may be varied in one or other direction.

What is claimed is:

1. A machine for picking olives, and similar fruits, comprising in combination:
   a wheeled chassis for supporting and transporting motive and working elements of the machine,
   a motor means carried by the wheeled chassis, said motor means having an output,
   a gear reduction unit connected to the output of the motor means,
   a plurality of picking units operatively connected to said gear reduction unit with each picking unit further comprising:
      a picking head having a plurality of picking fingers extending outwardly therefrom to engage and remove olives from a tree, said picking fingers being arranged to reciprocate in unison in up and down directions to remove olives from a tree,
   flexible driving means operatively interconnected between each picking head and said gear reduction unit so as to transmit rotary motion from the gear reduction unit to the picking head, and
   translating means for translating rotary motion transmitted by the flexible driving means into reciprocating motion applied to said picking fingers.

2. The machine of claim 1 wherein said motor means comprises an internal combustion engine.

3. The machine of claim 1 wherein said picking fingers are elliptical in cross-section and curved downwardly along their lengths.

4. The machine of claim 1 wherein said picking fingers have smooth, rounded surfaces.

References Cited

UNITED STATES PATENTS

| | | | |
|---|---|---|---|
| 925,885 | 6/1909 | Fahnestock | 56—339 |
| 1,091,096 | 3/1914 | Ulrich | 56—339 |
| 1,709,847 | 4/1929 | Gilliam | 56—340 |
| 2,288,682 | 7/1942 | Chittenden | 56—334 |
| 2,993,323 | 7/1961 | Tubbs | 56—330 |
| 3,165,880 | 1/1965 | Buie | 56—336 |
| 3,404,521 | 10/1968 | Thorn et al. | 56—328 |
| 3,417,554 | 12/1968 | Sudhoff | 56—27 |

RUSSELL R. KINSEY, Primary Examiner